United States Patent
Thakker et al.

(10) Patent No.: US 11,468,305 B2
(45) Date of Patent: Oct. 11, 2022

(54) HYBRID MEMORY ARTIFICIAL NEURAL NETWORK HARDWARE ACCELERATOR

(71) Applicant: Arm Limited, Cambridge (GB)

(72) Inventors: Urmish Ajit Thakker, Austin, TX (US); Shidhartha Das, Upper Cambourne (GB); Ganesh Suryanarayan Dasika, Austin, TX (US)

(73) Assignee: Arm Limited, Cambridge (GB)

( * ) Notice: Subject to any disclaimer, the term of this patent is extended or adjusted under 35 U.S.C. 154(b) by 393 days.

(21) Appl. No.: 16/822,640

(22) Filed: Mar. 18, 2020

(65) Prior Publication Data

US 2021/0295137 A1 Sep. 23, 2021

(51) Int. Cl.
*G06N 3/063* (2006.01)
*G06F 12/06* (2006.01)
*G06N 3/04* (2006.01)

(52) U.S. Cl.
CPC ......... *G06N 3/063* (2013.01); *G06F 12/0646* (2013.01); *G06N 3/04* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 11,106,972 B1* | 8/2021 | Verheyen | | G06N 3/063 |
| 2017/0277628 A1* | 9/2017 | Paul | | G06F 12/06 |
| 2018/0046894 A1* | 2/2018 | Yao | | G06F 7/483 |
| 2019/0034798 A1* | 1/2019 | Yu | | G06N 3/04 |
| 2019/0188557 A1* | 6/2019 | Lowell | | G06N 3/063 |
| 2020/0285892 A1* | 9/2020 | Baum | | G06N 3/084 |
| 2021/0048955 A1* | 2/2021 | Murphy | | G06F 3/0604 |
| 2021/0174203 A1* | 6/2021 | Lee | | G06N 3/08 |

OTHER PUBLICATIONS

Giterman et al., "4T Gain-Cell with Internal-Feedback for Ultra-Low Retention Power at Scaled CMOS Nodes," 2014 IEEE International Symposium on Circuits and Systems (ISCAS) (2014).

* cited by examiner

*Primary Examiner* — James A Thompson
(74) *Attorney, Agent, or Firm* — Leveque Intellectual Property Law, PC

(57) ABSTRACT

The present disclosure advantageously provides a hybrid memory artificial neural network hardware accelerator that includes a communication bus interface, a static memory, a non-refreshed dynamic memory, a controller and a computing engine. The static memory stores at least a portion of an ANN model. The ANN model includes an input layer, one or more hidden layers and an output layer, ANN basis weights, input data and output data. The non-refreshed dynamic memory is configured to store ANN custom weights for the input, hidden and output layers, and output data. For each layer or layer portion, the computing engine generates the ANN custom weights based on the ANN basis weights, stores the ANN custom weights in the non-refreshed dynamic memory, executes the layer or layer portion, based on inputs and the ANN custom weights, to generate layer output data, and stores the layer output data.

23 Claims, 7 Drawing Sheets

HYBRID MEMORY ARTIFICIAL NEURAL NETWORK HARDWARE ACCELERATOR

BACKGROUND

The present disclosure relates to computer systems. More particularly, the present disclosure relates to computer systems that include neural networks.

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, the multiply-and-accumulate (dot product) operations performed by CNNs.

An ANN hardware accelerator typically receives the ANN model and weights (or portions thereof) from system memory over a system bus, and stores this information in on-chip memory, such as embedded static random access memory (eSRAM), embedded dynamic random access memory (eDRAM), etc. Unfortunately, eSRAM generally requires more on-chip area, more power and is slower than other types of volatile memory. Additionally, issues often accompany the integration of eDRAM with other types of volatile memory on a single chip, such as, for example, process incompatibility, process integration complexity, chip area requirements, refresh energy requirements, refresh time requirements, fast wear-out, etc.

DETAILED DESCRIPTION

Figure 1:
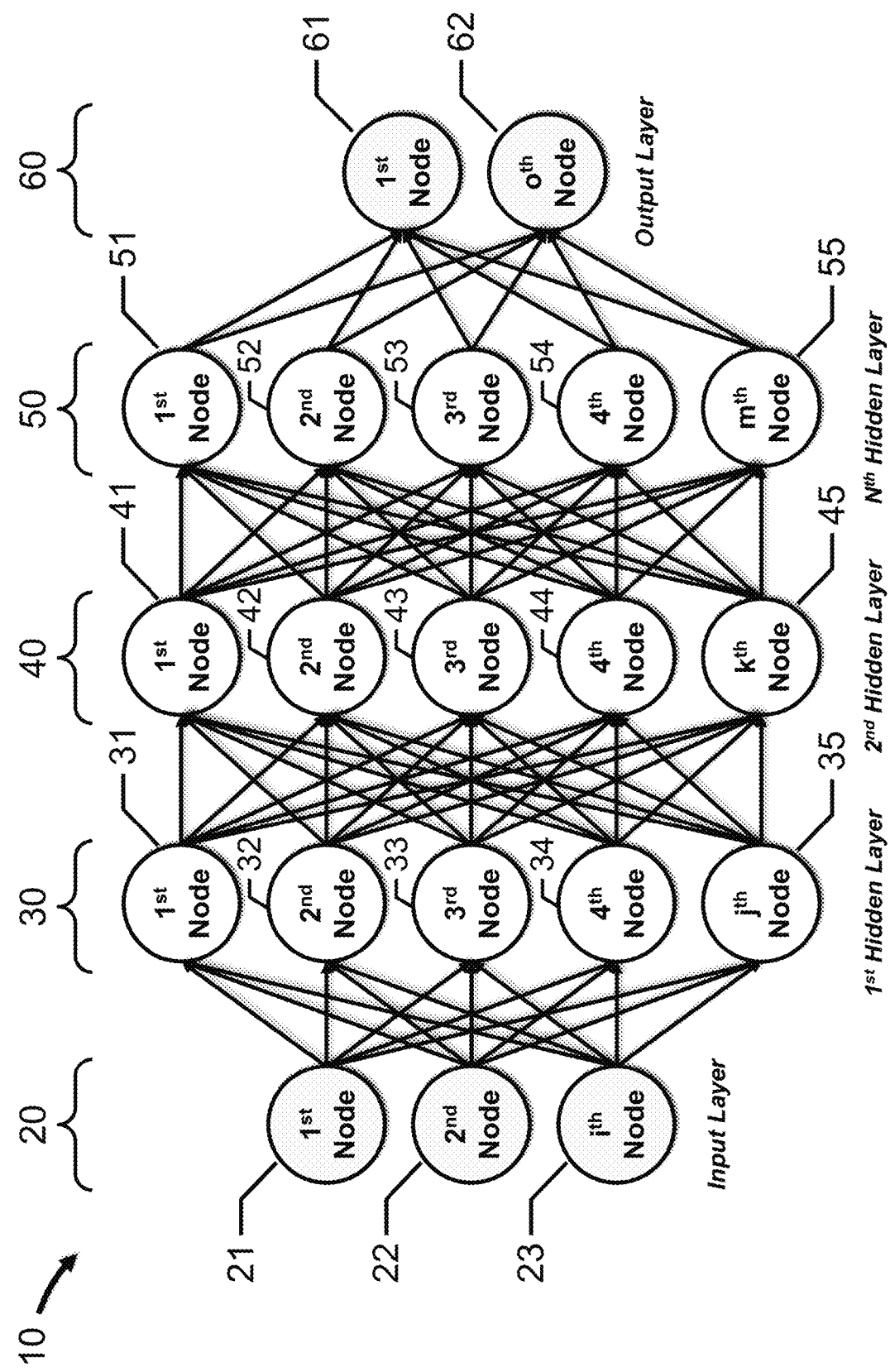
FIG. 1 depicts an ANN, in accordance with an embodiment of the present disclosure.

Embodiments of the present disclosure will now be described with reference to the drawing figures, in which like reference numerals refer to like parts throughout.

The term "static memory" generally describes a "non-refreshed" volatile memory, such as eSRAM. Static memory can store data as long as the memory is powered and does not require periodic refreshing. The term "dynamic memory" generally describes a "refreshed" volatile memory, such as eDRAM. Dynamic memory loses data if each memory cell is not periodically refreshed by reading and immediately rewriting the data stored within the cell without modification. Non-volatile memory (NVM) can store data when the memory is not powered.

Embodiments of the present disclosure advantageously provide a hybrid memory hardware accelerator for an ANN in which long-term data is stored in static memory, while short-term data is stored in non-refreshed dynamic memory.

More particularly, the hybrid memory hardware accelerator integrates a static memory, such as eSRAM, and a non-refreshed dynamic memory, such as logic-compatible eDRAM (LC-eDRAM), on a single chip, which advantageously avoids integration issues, reduces on-chip memory area requirements, reduces memory power requirements, increases memory access speed, and increases ANN performance. The non-refreshed dynamic memory stores transient data that are live for short durations such that refresh is not required. The transient data include ANN custom weights (described in more detail below), and, in certain embodiments, ANN model intermediate output data, such as activation data.

In one embodiment, a hybrid memory ANN hardware accelerator includes a communication bus interface, a static memory coupled to the communication bus interface, a non-refreshed dynamic memory, a controller coupled to the communication bus interface, the static memory and the non-refreshed dynamic memory, and a computing engine (CE), coupled to the static memory, the non-refreshed dynamic memory and the controller.

The communication bus interface is configured to receive at least a portion of an ANN model, ANN basis weights and input data, the ANN model including an input layer, one or more hidden layers and an output layer, and transmit output data. The static memory is configured to store the portion of the ANN model, the ANN basis weights, the input data and the output data. The non-refreshed dynamic memory is configured to store ANN custom weights for the portion of the ANN model.

When the portion of the ANN model is at least a portion of the input layer, the CE is configured to generate the ANN custom weights for the portion of the input layer based on the ANN basis weights, store the ANN custom weights for the portion of the input layer in the non-refreshed dynamic memory, execute the portion of the input layer of the ANN model, based on the input data and the ANN custom weights for the portion of the input layer, to generate input layer output data, and store the input layer output data in the non-refreshed dynamic memory.

When the portion of the ANN model is at least a portion of a hidden layer of the ANN model, the CE is configured to generate the ANN custom weights for the portion of the hidden layer based on the ANN basis weights, store the ANN custom weights for the portion of the hidden layer in the non refreshed dynamic memory, execute the portion of the hidden layer of the ANN model, based at least in part on the ANN custom weights for the portion of the hidden layer, to generate hidden layer output data, and store the hidden layer output data in the non-refreshed dynamic memory.

When the portion of the ANN model is at least a portion of the output layer, the CE is configured to generate the ANN custom weights for the portion of the output layer based on the ANN basis weights, store the ANN custom weights for the portion of the output layer in the non refreshed dynamic memory, execute the portion of the output layer of the ANN model, based at least in part on the ANN custom weights for the portion of the output layer, to generate the output data, and store the output data in the static memory.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
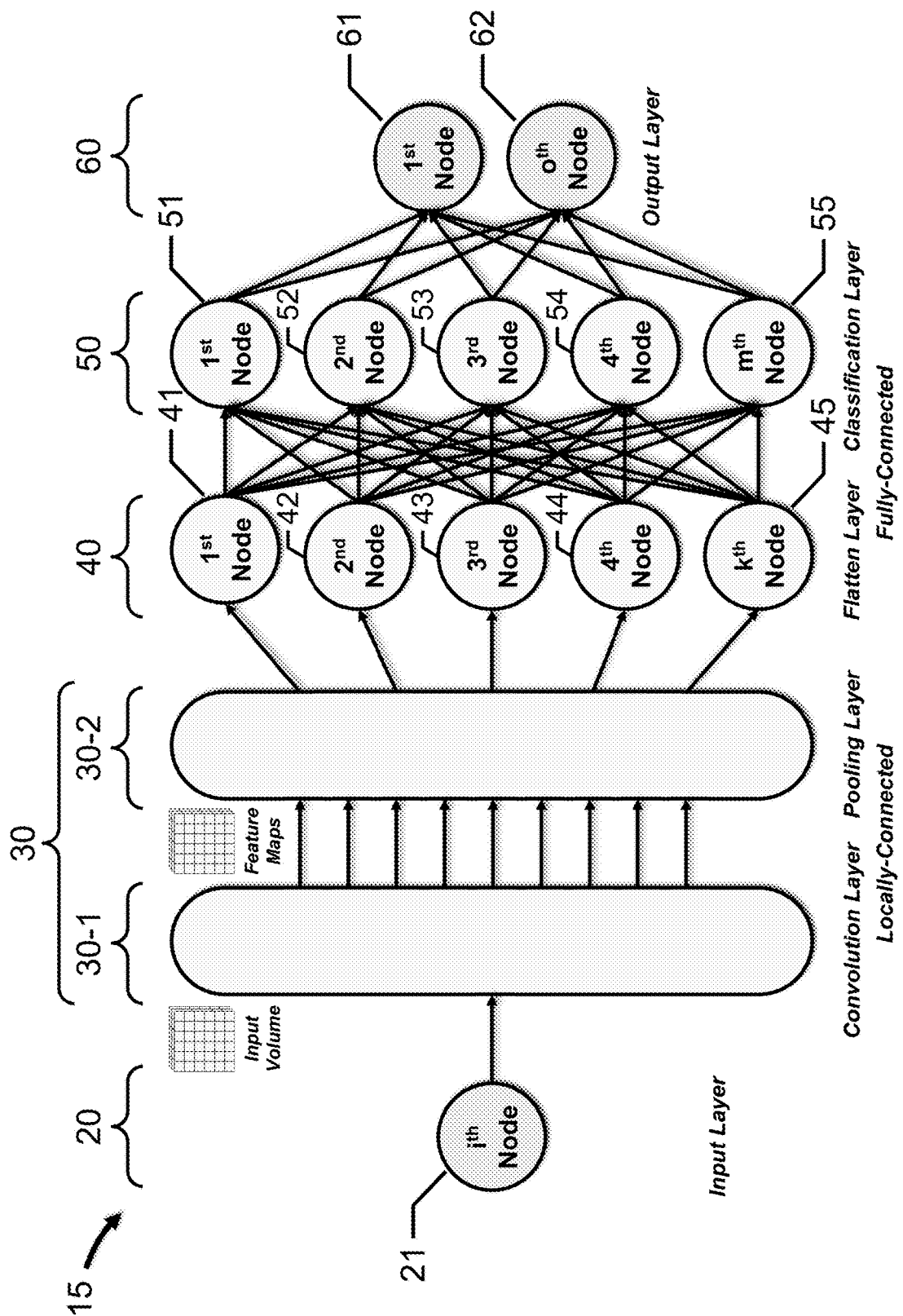
FIG. 2 depicts a convolutional neural network (CNN), in accordance with an embodiment of the present disclosure.

FIG. 2 depicts a CNN, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3:
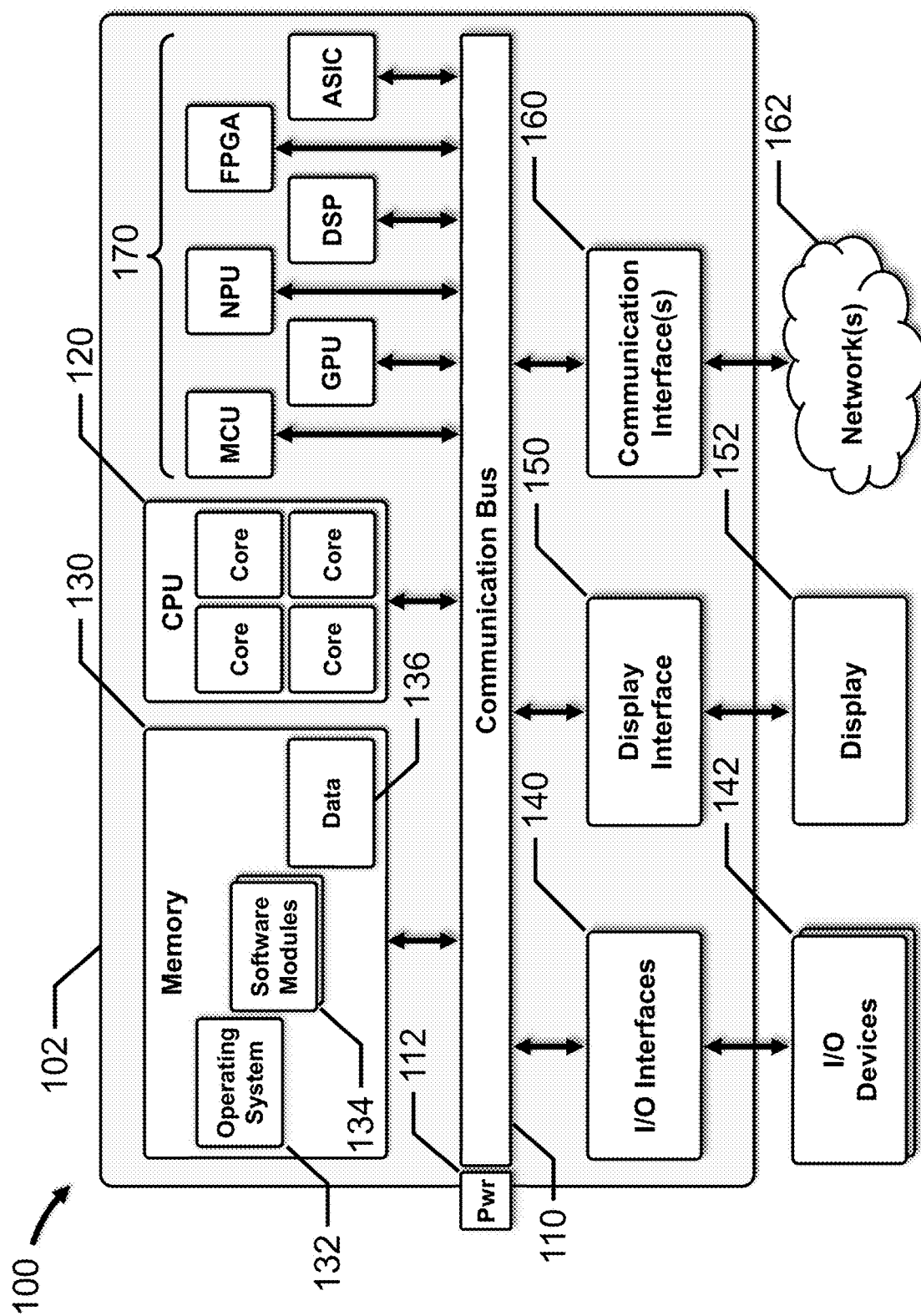
FIG. 3 depicts a block diagram of a system, in accordance with embodiments of the present disclosure.

FIG. 3 depicts a block diagram of system, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, HAs 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores.

For example, system 100 may include 2 processors 120, each containing multiple processing cores. In certain embodiments, the CPUs form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc.

In many embodiments, processor 120 may also be configured to execute classification-based machine learning (ML) models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute ML models, such as, for example, ANNs, CNNs, RNNs, etc., in support of various applications embodied by software modules 134. Generally, HAs 170 include one or more processors, coprocessors, processing engines (PEs), compute engines (CEs), etc., such as, for example, CPUs, MCUs, GPUs, NPUs (e.g., the ARM ML Processor), DSPs, field programmable gate arrays (FPGAs), application specific integrated circuits (ASICs), controllers, microcontrollers, matrix multiplier circuits, MAC arrays, etc. HAs 170 also include a communications bus interface as well as non-volatile and/or volatile memories, such as, for example, ROM, flash memory, SRAM, DRAM, etc.

In many embodiments, HA 170 receives the ANN model and weights from memory 130 over communication bus 110 for storage in local volatile memory (e.g., local SRAM, DRAM, etc.). In other embodiments, HA 170 receives a portion of the ANN model and weights from memory 130 over communication bus 110. In these embodiments, HA 170 determines the instructions needed to execute the ANN model or ANN model portion. In other embodiments, the ANN model (or ANN model portion) simply includes the instructions needed to execute the ANN model (or ANN model portion). In these embodiments, processor 120 determines the instructions needed to execute the ANN model, or, processor 120 divides the ANN model into ANN model portions, and then determines the instructions needed to execute each ANN model portion. The instructions are then provided to HA 170 as the ANN model or ANN model portion.

In further embodiments, HA 170 may store ANN models, instructions and weights in non-volatile memory. In certain embodiments, the ANN model may be directly implemented in hardware using PEs, CEs, matrix multiplier units, MAC arrays, etc. Generally, HA 170 receives input data from memory 130 over communication bus 110, and transmit output data to memory 130 over communication bus 110. In certain embodiments, the input data may be associated with a layer (or portion of a layer) of the ANN model, and the output data from that layer (or portion of that layer) may be transmitted to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Figure 4:
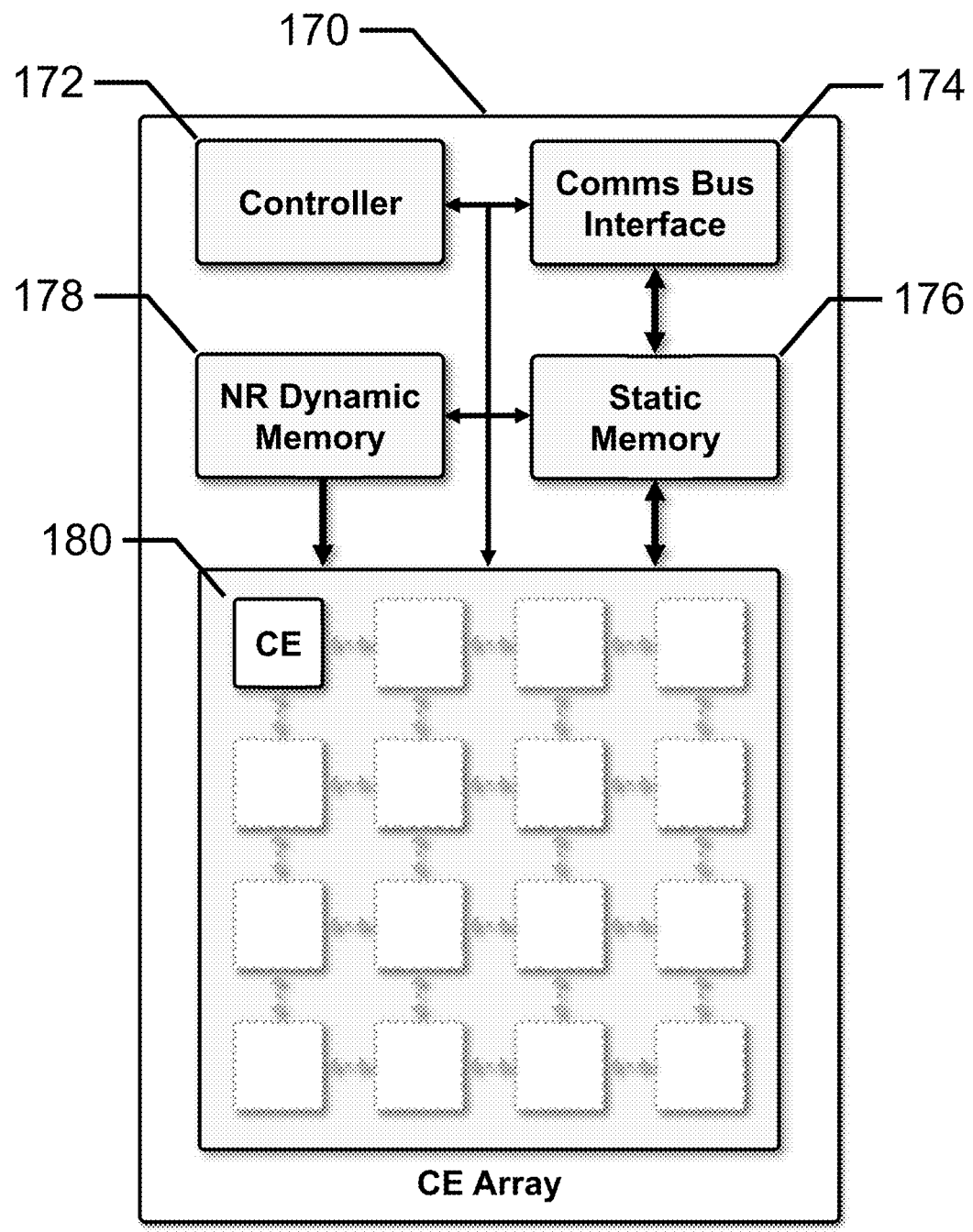
FIG. 4 depicts a block diagram of a hybrid memory ANN hardware accelerator, in accordance with embodiments of the present disclosure.

FIG. 4 depicts a block diagram of a hybrid memory ANN hardware accelerator, in accordance with embodiments of the present disclosure. HA 170 includes controller 172, communication bus interface 174, static memory 176 (e.g., local SRAM, eSRAM, etc.), non-refreshed dynamic memory 178 (e.g., non-refreshed LC-eDRAM, etc.), and one or more CEs 180. Controller 172 generally controls the components, functions, data flow, etc. of HA 170. In other embodiments, a number of interconnected CEs 180 may be provided as array, such as, for example, 4 CEs, 8 CEs, 16 CEs (depicted in phantom in FIG. 4), 32 CEs, etc. Multiple CEs 180 may be interconnected by a NoC using a ring topology, a star topology, a mesh topology, etc. Alternatively, multiple CEs 180 may be interconnected using a cross-bar switch, direct connections, etc. Generally, each CE 180 may execute a portion of an ANN model using a portion of the ANN weights. In alternative embodiments, static memory 176 may be NVM, refreshed DRAM, etc.

Figure 5:
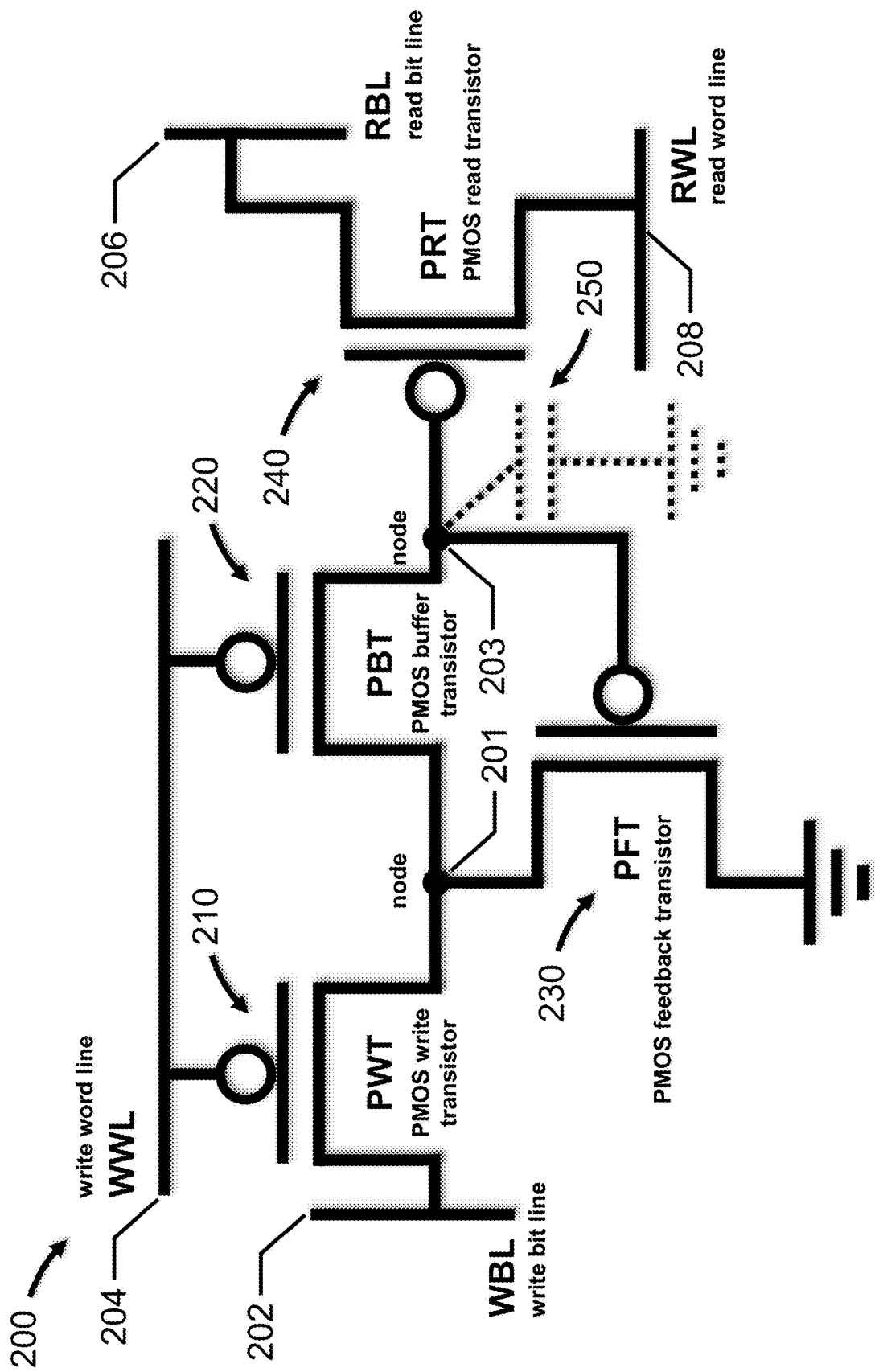
FIG. 5 depicts a block diagram of a non-refreshed dynamic memory bit-cell, in accordance with embodiments of the present disclosure.

FIG. 5 depicts a block diagram of a non-refreshed dynamic memory bit-cell, in accordance with embodiments of the present disclosure.

Non-refreshed LC-eDRAM bit-cell 200 includes 4 P-type metal-oxide-semiconductor (PMOS) transistors, i.e., PMOS write transistor (PWT) 210, PMOS buffer transistor (PBT) 220, PMOS feedback transistor (PFT) 230, PMOS read transistor (PRT) 240, and an inherent capacitance 250. Each PMOS transistor includes source, gate and drain connections. PWT 210 is coupled to write bit line (WBL) 202 via the source connection, write word line (WWL) 204 via the gate connection, and node 201 via the drain connection. PBT 220 is coupled to node 201 via the source connection, WWL 204 via the gate connection, and node 203 via the drain connection. PFT 230 is coupled to node 201 via the source connection, node 203 via the gate connection, and ground via the drain connection. PRT 240 is coupled to read bit line (RBL) 206 via the source connection, node 203 via the gate connection, and read word line (RWL) 208 via the drain connection. Inherent capacitance 250 is present at node 203, in varying strength, based on the influences of PWT 210, PBT 220, PFT 230 and PRT 240.

In addition to the write transistor (e.g., PWT 210) and the read transistor (e.g., PRT 240) of a standard 2 PMOS transistor bit-cell, node 203 is connected in a feedback loop to PFT 230, which conditionally discharges node 201 according to the charge level stored in inherent capacitance 250. PBT 220 separates inherent capacitance 250 from node 201 to ensure extended retention time. Non-refreshed LC-eDRAM bit-cell 200 may be advantageously constructed using standard threshold-voltage (VT) transistors and is fully compatible with standard CMOS processes. In many embodiments, PMOS transistors may be preferred over N-type metal-oxide-semiconductor (NMOS) transistors due to their lower sub-VT and gate leakages which provide longer retention times while maintaining a small cell area.

Generally, non-refreshed LC-eDRAM bit-cell 200 operates as follows. During writes, WWL 204 is pulsed to a negative voltage in order to enable a full discharge of node 203 when writing a zero ("0"). Readout is accomplished by pre-discharging RBL 206 to ground and subsequently charging RWL 208 to $V_{DD}$. RBL 206 is then conditionally charged if node 203 is low, otherwise, RBL 206 remains discharged.

More particularly, writing a zero ("0") to node 203 is accomplished by pulsing WWL 204 to a negative voltage (e.g., −700 mV), which discharges node 203 through WBL 202. A read operation may be accomplished by pre-discharging RBL 206, and then charging RWL 208. RBL 206 is then driven high through PRT 240. Before the next assertion of WWL 204, WBL 202 is driven high to write a one ("1") to node 203. During the next read cycle, the pre-discharged RBL 206 remains low, because the stored one ("1") blocks the discharge path through PRT 240.

Because non-refreshed LC-eDRAM bit-cell 200 loses its charge (or inherent capacitance) over time, data stored in non-refreshed LC-eDRAM bit-cell 200 must be consumed prior to its degradation and corruption. In other words, CE 180 should complete processing a particular ANN model layer (or layer portion) before the associated ANN custom weights stored in non-refreshed dynamic memory 178, such as an LC-eDRAM, degrade and become corrupted. In order to avoid the use of corrupt data during the processing of a particular ANN model layer (or portion of an ANN model layer), the ANN custom weights may be regenerated and stored (again) in non-refreshed dynamic memory 178.

In one embodiment, non-refreshed dynamic memory 178 is an LC-eDRAM that includes an array of LC-eDRAM bit-cells 200 with one or more additional bit-cell columns that change state faster than the array of LC-eDRAM bit-cells 200. In this embodiment, the additional bit-cell column(s) may indicate when the data stored in non-refreshed dynamic memory 178 should be regenerated. Accordingly, during the processing of each ANN model layer (or layer portion), in response to detecting a change of state of the additional bit-cell column, the ANN custom weights for that layer may be regenerated and stored (again) in non-refreshed dynamic memory 178.

In another embodiment, a countdown timer may be used to indicate when the data stored in non-refreshed dynamic memory 178 should be regenerated. Accordingly, during the processing of each ANN model layer (or layer portion), in response to detecting an expiration of a countdown timer, the ANN custom weights for that layer (or layer portion) may be regenerated and stored (again) in non-refreshed dynamic memory 178.

In an alternative embodiment, certain ANN model layers (or layer portions) may require significantly more processing time than the "lifetime" of the data stored in non-refreshed dynamic memory 178. In this situation, regeneration of the ANN custom weights for that layer (or layer portion) may add significant overhead to the performance of the ANN model. In this alternative embodiment, the ANN custom weights for a processing-intensive ANN model layer (or layer portion) may be stored in static memory 176 rather than non-refreshed dynamic memory 178. The determination to store the ANN custom weights for a particular processing-intensive ANN model layer (or layer portion) in static memory 176 may be performed during the training of the ANN model, during the design of the ANN model, during the design of system 100, etc.

In one alternative embodiment, CE 180 stores a portion of the ANN custom weights, such as, for example, the ANN custom weights for a particular ANN model layer (or layer portion), in static memory 176 based on ANN model training performance data. CE 180 may also store the output data from the layer (or layer portion) in static memory 176 based on ANN model training performance data.

Figure 6:
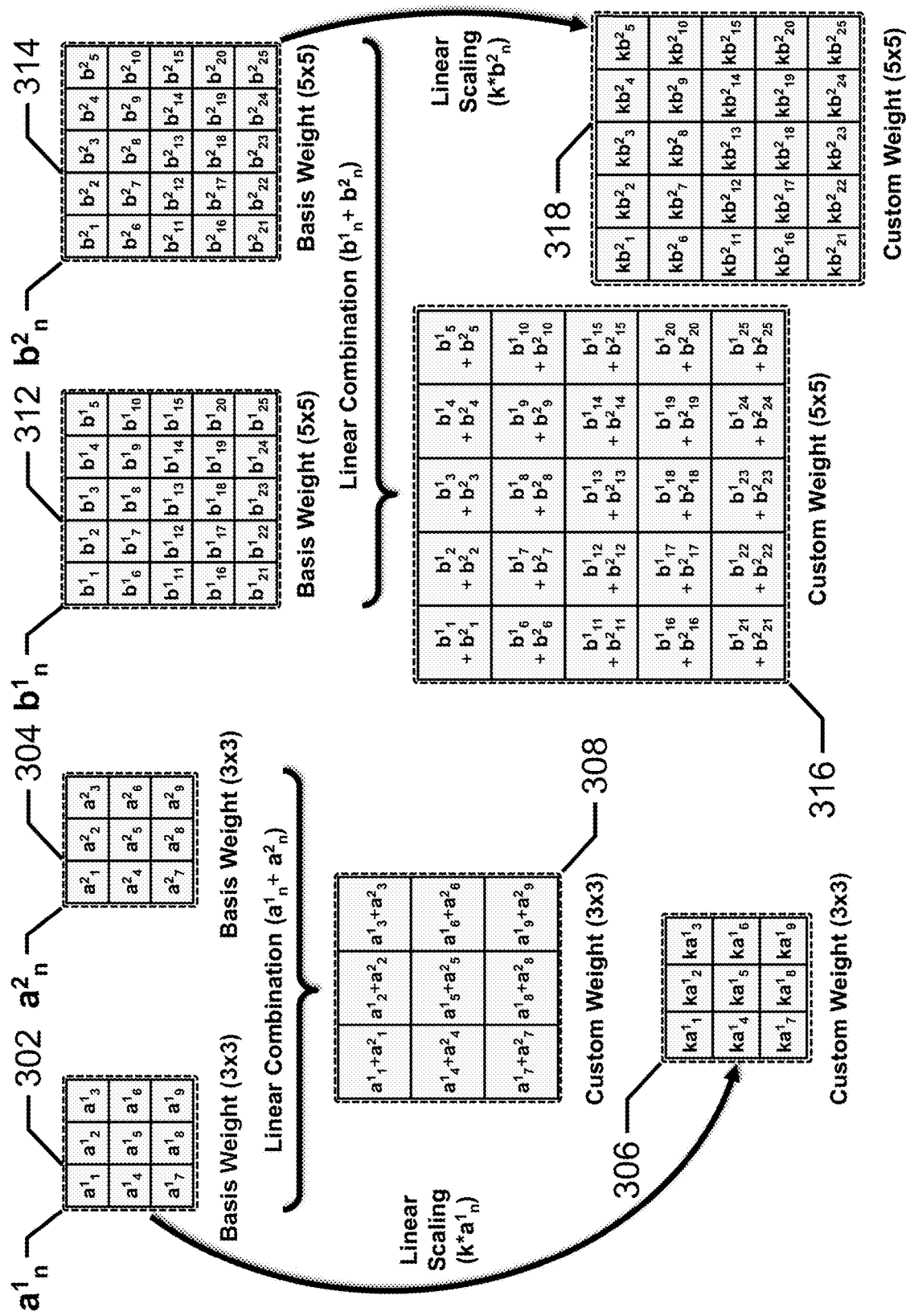
FIG. 6 depicts ANN basis weights and ANN custom weights, in accordance with embodiments of the present disclosure.

FIG. 6 depicts ANN basis weights and ANN custom weights, in accordance with embodiments of the present disclosure.

Generally, to form an ANN custom weight for a particular layer (or layer portion), such as convolutional layer 30-1, an ANN basis weight may be scaled by a particular value, such as "k," two (or more) ANN basis weights may be linearly combined, two (or more) ANN basis weights may be non-linearly combined, etc.

ANN basis weight 302 is a weight matrix (3×3), such as a convolutional filter or kernel, that includes weights $a^1_1$, $a^1_2$, $a^1_3$, $a^1_4$, $a^1_5$, $a^1_6$, $a^1_7$, $a^1_8$, and $a^1_9$. ANN basis weight 304 is another weight matrix (3×3), such as a convolutional filter or kernel, that includes weights $a^2_1$, $a^2_2$, $a^2_3$, $a^2_4$, $a^2_5$, $a^2_6$, $a^2_7$, $a^2_8$, and $a^2_9$. For example, ANN custom weight 306 may be generated by multiplying the elements of ANN basis weight 302 by a scalar value "k." In another example, ANN custom weight 308 may be generated by combining (i.e., adding) the elements of ANN basis weight 302 and ANN basis weight 304.

ANN basis weight 312 is a weight matrix (5×5), such as a convolutional filter or kernel, that includes weights $b^1_1$, $b^1_2$, $b^1_3$, $b^1_4$, $b^1_5$, $b^1_6$, $b^1_7$, $b^1_8$, $b^1_9$, $b^1_{10}$, $b^1_{11}$, $b^1_{12}$, $b^1_{13}$, $b^1_{14}$, $b^1_{15}$, $b^1_{16}$, $b^1_{17}$, $b^1_{18}$, $b^1_{19}$, $b^1_{20}$, $b^1_{21}$, $b^1_{22}$, $b^1_{23}$, $b^1_{24}$, and $b^1_{25}$. ANN basis weight 314 is another weight matrix (5×5), such as a convolutional filter or kernel, that includes weights $b^2_1$, $b^2_2$, $b^2_3$, $b^2_4$, $b^2_5$, $b^2_6$, $b^2_7$, $b^2_8$, $b^2_9$, $b^2_{10}$, $b^2_{11}$, $b^2_{12}$, $b^2_{13}$, $b^2_{14}$, $b^2_{15}$, $b^2_{16}$, $b^2_{17}$, $b^2_{18}$, $b^2_{19}$, $b^2_{20}$, $b^2_{21}$, $b^2_{22}$, $b^2_{23}$, $b^2_{24}$, and $b^2_{25}$. For example, ANN custom weight 316 may be generated by multiplying the elements of ANN basis weight 312 by a scalar value "k." In another example, ANN custom weight 318 may be generated by combining (i.e., adding) the elements of ANN basis weight 312 and ANN basis weight 314.

The ANN custom weights are determined during the training phase of the ANN model. As noted above, training the ANN model includes optimizing the connection weights between nodes by minimizing the prediction error of the output data until the ANN model achieves a particular level of accuracy. One method is backpropagation, or backward propagation of errors, which iteratively and recursively determines a gradient descent with respect to the connection weights, and then adjusts the connection weights to improve the performance of the network.

In one embodiment, ANN basis weights for each layer of the ANN model are selected prior to training. The ANN basis weights for each layer are then initialized. During each training iteration, the ANN basis weights for each layer are perturbed, and the perturbation(s) (i.e., weight parameters) associated with each ANN basis weight are stored for the next iteration of the training process. At the completion of training, the ANN basis weights and the final perturbations (i.e., weight parameters) for each ANN basis weight form the ANN custom weights for the ANN model.

In another embodiment, ANN basis weights for each layer of the ANN model are selected prior to training. The ANN basis weights for each layer are then initialized. During each training iteration, the ANN basis weights for each layer are perturbed, and new ANN basis weights are stored for the next iteration of the training process. At the completion of training, the difference or final perturbation, between each final ANN basis weight and each initial ANN basis weight is determined. The initial ANN basis weights and the final perturbations (i.e., weight parameters) form the ANN custom weights for the ANN model.

For example, the ANN custom weights for each ANN model layer (or layer portion) may be generated by linearly-combining two or more ANN basis weights, as described above. In this example, the ANN model layer parameters include an identification (ID) of each ANN basis weight to be combined for each ANN custom weight.

In another example, an ANN custom weight for a particular ANN model layer (or layer portion) may be generated by scaling the associated ANN basis weight based on the final perturbation (i.e., weight parameter), as described above. In this example, the ANN model layer parameters include the scale factor and an ID of the ANN basis weight for each ANN custom weight.

In other examples, a binary or ternary parameter may be used in place of the weight parameter and ANN basis weight, or a ternary parameter may be used to determine whether a full-precision scalar value is added, subtracted or ignored when computing the ANN custom weight value.

Figure 7:
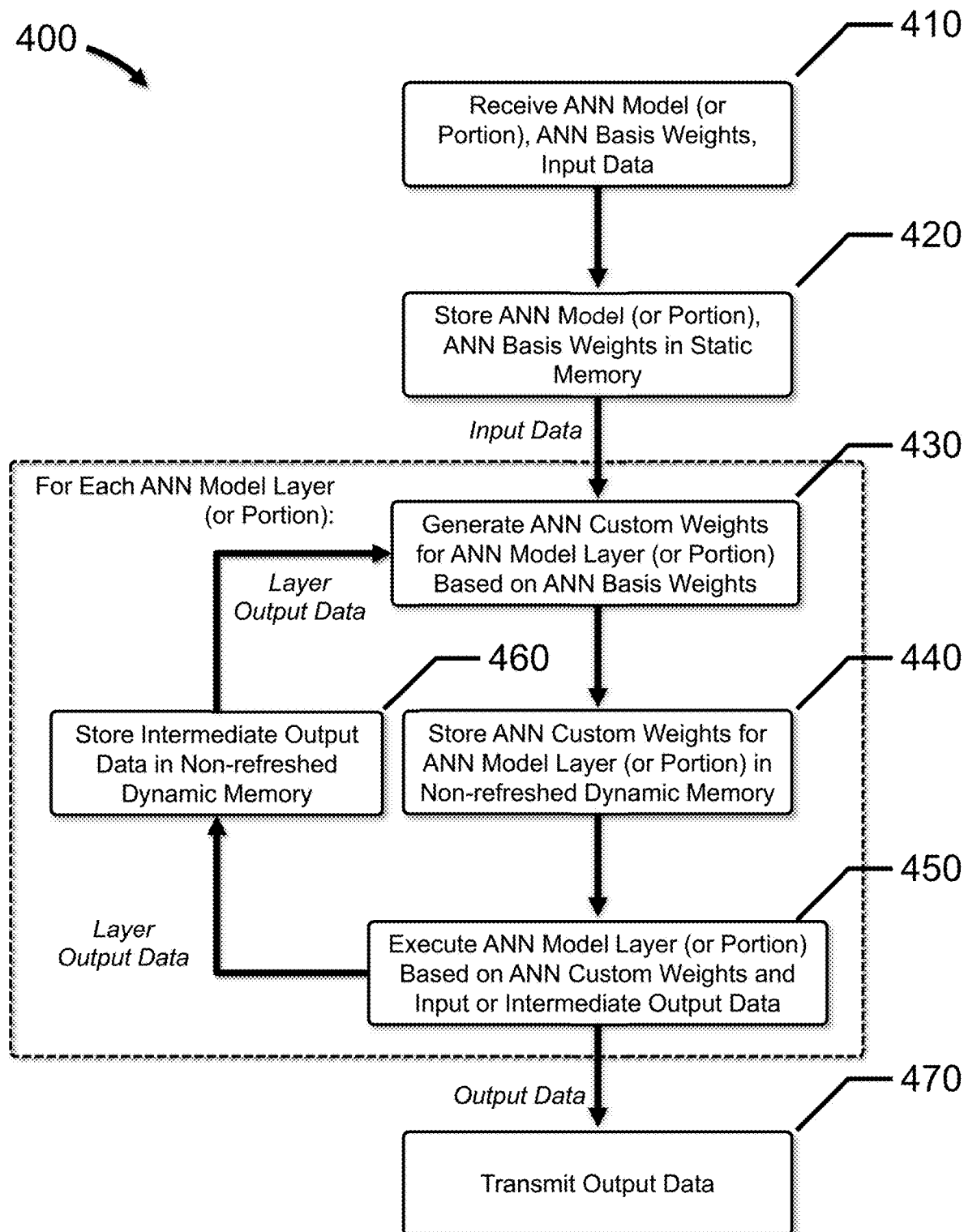
FIG. 7 depicts a flow diagram presenting functionality for accelerating an ANN using a hardware accelerator, in accordance with embodiments of the present disclosure.

FIG. 7 depicts a flow diagram 300 presenting functionality for accelerating an ANN using a hybrid memory hardware accelerator, in accordance with embodiments of the present disclosure.

At 310, at least a portion of an ANN model, ANN basis weights and input data are received, via communications bus interface 174, from memory 130. The ANN model includes an input layer, one or more hidden layers and an output layer.

At 320, the portion of the ANN model, the ANN basis weights, and the input data are stored in static memory 176.

The functionality at 330, 340, 350 and 360 are repeated for each ANN model layer or layer portion.

For the input layer (or input layer portion) of the ANN model, at 330, ANN custom weights for the input layer (or input layer portion) are generated by CE 180 based on the ANN basis weights that are stored in static memory 176. At 340, the ANN custom weights for the input layer (or input layer portion) are stored in non-refreshed dynamic memory 178. At 350, the input layer (or input layer portion) of the ANN model is executed by CE 180, based on the input data and the ANN custom weights for the input layer (or input layer portion), to generate input layer output data. At 360, the input layer output data are stored in non-refreshed dynamic memory 178. In certain embodiments, the input layer output data may be transferred to memory 130 via communication bus 110.

For each hidden layer (or hidden layer portion) of the ANN model, at 330, ANN custom weights for the hidden layer (or hidden layer portion) are generated by CE 180 based on the ANN basis weights that are stored in static memory 176. At 340, the ANN custom weights for the hidden layer (or hidden layer portion) are stored in non-refreshed dynamic memory 178. At 350, the hidden layer (or hidden layer portion) of the ANN model is executed by CE 180, based at least in part on the ANN custom weights for the hidden layer (or hidden layer portion) stored in non-refreshed dynamic memory 178, to generate hidden layer output data. At 360, the hidden layer output data are stored in non-refreshed dynamic memory 178. In other embodiments, the hidden layer output data may be transferred to memory 130 via communication bus 110.

In many embodiments, the CE is configured to execute a portion of the hidden layer of the ANN model, based on the input layer output data and the ANN custom weights for the portion of the hidden layer, to generate the hidden layer output data. In other embodiments, the input data are associated with at least a portion of a hidden layer of the ANN model, and the CE is configured to execute the portion of the hidden layer of the ANN model, based on the input data and the ANN custom weights for the portion of the hidden layer, to generate the hidden layer output data.

For the output layer (or output layer portion) of the ANN model, at 330, ANN custom weights for the output layer (or output layer portion) are generated by CE 180 based on the ANN basis weights that are stored in static memory 176. At 340, the ANN custom weights for the output layer (or output layer portion) are stored in non-refreshed dynamic memory 178. At 350, the output layer (or output layer portion) of the ANN model is executed by CE 180, based at least in part on the ANN custom weights for the output layer (or output layer portion) stored in non-refreshed dynamic memory 178, to generate output data. At 360, the output data are stored in static memory 176.

In many embodiments, the CE is configured to execute a portion of the output layer of the ANN model, based on the hidden layer output data and the ANN custom weights for the portion of the output layer, to generate the output data. In other embodiments, the input data are associated with at least a portion of the output layer of the ANN model, the CE is configured to execute the portion of the output layer of the ANN model, based on the input data and the ANN custom weights for the portion of the output layer, to generate the output data.

At 370, the output data are transmitted, via communications bus interface 174, to memory 130. In certain embodiments, the input layer output data are transmitted, via communications bus interface 174, to memory 130. In other embodiments, the hidden layer output data are transmitted, via communications bus interface 174, to memory 130.

As noted above, embodiments of the present disclosure advantageously provide a hybrid memory ANN hardware accelerator. More particularly, the hybrid memory ANN hardware accelerator integrates static memory, such as eSRAM, and non-refreshed dynamic memory, such as non-refreshed LC-eDRAM, on a single chip which advantageously avoids integration issues, reduces on-chip memory area requirements, reduces memory power requirements, increases memory access speed, and increases ANN performance. Non-refreshed dynamic memory stores transient data that are live for short durations such that refresh is not required. The transient data include ANN custom weights, and, in certain embodiments, ANN model intermediate output data, such as activation data.

The embodiments described herein are combinable.

In one embodiment, a hybrid memory ANN hardware accelerator includes a communication bus interface, a static memory coupled to the communication bus interface, a non-refreshed dynamic memory, a controller coupled to the communication bus interface, the static memory and the non-refreshed dynamic memory, and a computing engine (CE), coupled to the static memory, the non-refreshed dynamic memory and the controller.

The communication bus interface is configured to receive at least a portion of an ANN model, ANN basis weights and input data, the ANN model including an input layer, one or more hidden layers and an output layer, and transmit output data. The static memory is configured to store the portion of the ANN model, the ANN basis weights, the input data and the output data. The non-refreshed dynamic memory is configured to store ANN custom weights for the portion of the ANN model.

When the portion of the ANN model is at least a portion of the input layer, the CE is configured to generate the ANN custom weights for the portion of the input layer based on the ANN basis weights, store the ANN custom weights for the portion of the input layer in the non-refreshed dynamic memory, execute the portion of the input layer of the ANN model, based on the input data and the ANN custom weights for the portion of the input layer, to generate input layer output data, and store the input layer output data in the non-refreshed dynamic memory, When the portion of the ANN model is at least a portion of a hidden layer of the ANN model, the CE is configured to generate the ANN custom weights for the portion of the hidden layer based on the ANN basis weights, store the ANN custom weights for the portion of the hidden layer in the non refreshed dynamic memory, execute the portion of the hidden layer of the ANN model, based at least in part on the ANN custom weights for the portion of the hidden layer, to generate hidden layer output data, and store the hidden layer output data in the non-refreshed dynamic memory.

When the portion of the ANN model is at least a portion of the output layer, the CE is configured to generate the ANN custom weights for the portion of the output layer based on the ANN basis weights, store the ANN custom weights for the portion of the output layer in the non refreshed dynamic memory, execute the portion of the output layer of the ANN model, based at least in part on the ANN custom weights for the portion of the output layer, to generate the output data, and store the output data in the static memory.

In another embodiment of the hybrid memory hardware accelerator, the static memory is an embedded static random access memory (eSRAM) and the non-refreshed dynamic memory is a logic-compatible embedded dynamic random access memory (LC-eDRAM) that is not refreshed.

In another embodiment of the hybrid memory hardware accelerator, the LC-eDRAM includes a bit-cell array and a bit-cell column that changes state faster than the bit-cell array, and the CE is configured to, in response to detecting a change of state of the bit-cell column, during execution of the portion of the input layer, regenerate and store the ANN custom weights for the portion of the input layer in the non-refreshed dynamic memory; during execution of the portion of the hidden layer, regenerate and store the ANN custom weights for the portion of the hidden layer in the non-refreshed dynamic memory; and during execution of the portion of the output layer, regenerate and store the ANN custom weights for the portion of the output layer in the non-refreshed dynamic memory.

In another embodiment of the hybrid memory hardware accelerator, the CE is configured to, in response to detecting an expiration of a countdown timer, during execution of the portion of the input layer, regenerate and store the ANN custom weights for the portion of the input layer in the non-refreshed dynamic memory; during execution of the portion of the hidden layer, regenerate and store the ANN custom weights for the portion of the hidden layer in the non-refreshed dynamic memory; and during execution of the portion of the output layer, regenerate and store the ANN custom weights for the portion of the output layer in the non-refreshed dynamic memory.

In another embodiment of the hybrid memory hardware accelerator, the CE is configured to, store a portion of the ANN custom weights in the static memory based on ANN model training performance data; and store a portion of the input layer output data or the hidden layer output data in the static memory based on ANN model training performance data.

In another embodiment of the hybrid memory hardware accelerator, the ANN model includes input layer parameters, hidden layer parameters, and output layer parameters; the ANN custom weights for the portion of the input layer are generated based on the ANN basis weights and the input layer parameters; the ANN custom weights for the portion of the hidden layer are generated based on the ANN basis weights and the hidden layer parameters; and the ANN custom weights for the portion of the output layer are generated based on the ANN basis weights and the output layer parameters.

In another embodiment of the hybrid memory hardware accelerator, the ANN custom weights for the portion of the input layer, the portion of the hidden layer and the portion of the output layer are generated by linear combinations of two or more ANN basis weights.

In another embodiment of the hybrid memory hardware accelerator, the ANN custom weights for the portion of the input layer, the portion of the hidden layer and the portion of the output layer are generated by scaling ANN basis weights.

In another embodiment of the hybrid memory hardware accelerator, the CE is connected to one or more additional CEs to form an array of CEs, and each CE executes a portion of the ANN model.

In another embodiment of the hybrid memory hardware accelerator, the communication bus interface is configured to transmit the input layer output data; the input data are associated with at least a portion of a hidden layer of the ANN model, the CE is configured to execute the portion of the hidden layer of the ANN model, based on the input data and the ANN custom weights for the portion of the hidden layer, to generate the hidden layer output data, and the communication bus interface is configured to transmit the hidden layer output data; or the input data are associated with at least a portion of the output layer of the ANN model, the CE is configured to execute the portion of the output layer of the ANN model, based on the input data and the ANN custom weights for the portion of the output layer, to generate the output data.

In another embodiment of the hybrid memory hardware accelerator, the CE is configured to execute a portion of the hidden layer of the ANN model, based on the input layer output data and the ANN custom weights for the portion of the hidden layer, to generate the hidden layer output data; or the CE is configured to execute a portion of the output layer of the ANN model, based on the hidden layer output data and the ANN custom weights for the portion of the output layer, to generate the output data.

In a further embodiment, a method for accelerating an artificial neural network (ANN) using a hardware accelerator includes receiving, via a communications bus interface, at least a portion of an ANN model, ANN basis weights and input data, the ANN model including an input layer, one or more hidden layers and an output layer; storing the portion of the ANN model, the ANN basis weights, and the input data in a static memory, and executing, by a computing engine (CE), the ANN model; and transmitting, via the communications bus interface, the output data.

When the portion of the ANN model is at least a portion of the input layer, executing the ANN model includes generating ANN custom weights for the portion of the input layer based on the ANN basis weights, storing the ANN custom weights for the portion of the input layer in a non-refreshed dynamic memory, executing the portion of the input layer of the ANN model, based on the input data and the ANN custom weights for the portion of the input layer, to generate input layer output data, and storing the input layer output data in the non-refreshed dynamic memory.

When the portion of the ANN model is at least a portion of a hidden layer of the ANN model, executing the ANN model includes generating the ANN custom weights for the portion of the hidden layer based on the ANN basis weights, storing the ANN custom weights for the portion of the hidden layer in the non refreshed dynamic memory, executing the portion of the hidden layer of the ANN model, based at least in part on the ANN custom weights for the portion of the hidden layer, to generate hidden layer output data, and storing the hidden layer output data in the non-refreshed dynamic memory.

When the portion of the ANN model is at least a portion of the output layer, executing the ANN model includes generating the ANN custom weights for the portion of the output layer based on the ANN basis weights, storing the ANN custom weights for the portion of the output layer in the non refreshed dynamic memory, executing the portion of the output layer of the ANN model, based at least in part on the ANN custom weights for the portion of the output layer, to generate output data, and storing the output data in the static memory.

In another embodiment of the method, the static memory is an embedded static random access memory (eSRAM) and the non-refreshed dynamic memory is a logic compatible embedded dynamic random access memory (LC-eDRAM) that is not refreshed.

In another embodiment of the method, the LC-eDRAM includes a bit-cell array and a bit-cell column that changes state faster than the bit-cell array, and the method further comprises in response to detecting a change of state of the bit-cell column during execution of the portion of the input layer, regenerating and storing the ANN custom weights for the portion of the input layer in the non-refreshed dynamic memory; during execution of the portion of the hidden layer, regenerating and storing the ANN custom weights for the portion of the hidden layer in the non refreshed dynamic memory; and during execution of the portion of the output layer, regenerating and storing the ANN custom weights for the portion of the output layer in the non refreshed dynamic memory.

In another embodiment of the method, the method further comprises, in response to detecting an expiration of a countdown timer, during execution of the portion of the input layer, regenerating and storing the ANN custom weights for the portion of the input layer in the non-refreshed dynamic memory; during execution of the portion of the hidden layer, regenerating and storing the ANN custom weights for the portion of the hidden layer in the non refreshed dynamic memory; and during execution of the portion of the output layer, regenerating and storing the ANN custom weights for the portion of the output layer in the non refreshed dynamic memory.

In another embodiment of the method, the method further comprises, storing a portion of the ANN custom weights in the static memory based on ANN model training performance data; and storing a portion of the input layer output data or the hidden layer output data in the static memory based on ANN model training performance data.

In another embodiment of the method, the ANN model includes input layer parameters, hidden layer parameters, and output layer parameters; the ANN custom weights for the portion of the input layer are generated based on the ANN basis weights and the input layer parameters; the ANN custom weights for the portion of the hidden layer are generated based on the ANN basis weights and the hidden layer parameters; and the ANN custom weights for the portion of the output layer are generated based on the ANN basis weights and the output layer parameters.

In another embodiment of the method, the ANN custom weights for the portion of the input layer, the portion of the hidden layer and the portion of the output layer are generated by linear combinations of two or more ANN basis weights.

In another embodiment of the method, the ANN custom weights for the portion of the input layer, the portion of the hidden layer and the portion of the output layer are generated by scaling ANN basis weights.

In another embodiment of the method, the CE is connected to one or more additional CEs to form an array of CEs, and each CE executes a portion of the ANN model.

In another embodiment of the method, the input layer output data are transmitted via the communications bus interface; the input data are associated with at least a portion of a hidden layer of the ANN model, the CE executes the portion of the hidden layer of the ANN model, based on the input data and the ANN custom weights for the portion of the hidden layer, to generate the hidden layer output data, and the hidden layer output data are transmitted via the communications bus interface; or the input data are associated with at least a portion of the output layer of the ANN model, and the CE executes the portion of the output layer of the ANN model, based on the input data and the ANN custom weights for the portion of the output layer, to generate the output data.

In another embodiment of the method, the CE executes a portion of the hidden layer of the ANN model, based on the input layer output data and the ANN custom weights for the portion of the hidden layer, to generate the hidden layer output data; or the CE executes a portion of the output layer of the ANN model, based on the hidden layer output data and the ANN custom weights for the portion of the output layer, to generate the output data.

In a further embodiment, an additional method for accelerating an artificial neural network (ANN) using a hardware accelerator includes receiving, via a communications bus interface, at least a portion of an ANN model, ANN basis weights and input data, the ANN model including an input layer, one or more hidden layers and an output layer; storing the portion of the ANN model, the ANN basis weights, and the input data in a static memory; executing, by a computing engine (CE), at least a portion of a layer of the ANN model, including generating ANN custom weights based on the ANN basis weights, storing the ANN custom weights in a non-refreshed dynamic memory, executing the portion of the layer of the ANN model, based on inputs and the ANN custom weights, to generate outputs, and storing the outputs in the non-refreshed dynamic memory; and transmitting, via the communications bus interface, output data.

In another embodiment of the additional method, the ANN custom weights for the portion of the input layer, the portion of the hidden layer and the portion of the output layer are generated by linear combinations of two or more ANN basis weights or by scaling ANN basis weights.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hybrid memory hardware accelerator for an artificial neural network (ANN), comprising:
   a communication bus interface configured to:
      receive at least a portion of an ANN model, ANN basis weights and input data, the ANN model including an input layer, one or more hidden layers and an output layer, and
      transmit output data;
   a static memory, coupled to the communication bus interface, configured to store the portion of the ANN model, the ANN basis weights, the input data and the output data;
   a non-refreshed dynamic memory configured to store ANN custom weights for the portion of the ANN model;
   a controller coupled to the communication bus interface, the static memory and the non-refreshed dynamic memory; and
   a computing engine (CE), coupled to the static memory, the non-refreshed dynamic memory and the controller, configured to:
      when the portion of the ANN model is at least a portion of the input layer:
         generate the ANN custom weights for the portion of the input layer based on the ANN basis weights, store the ANN custom weights for the portion of the input layer in the non-refreshed dynamic memory, execute the portion of the input layer of the ANN model, based on the input data and the ANN custom weights for the portion of the input layer, to generate input layer output data, and store the input layer output data in the non-refreshed dynamic memory, when the portion of the ANN model is at least a portion of a hidden layer of the ANN model:
generate the ANN custom weights for the portion of the hidden layer based on the ANN basis weights, store the ANN custom weights for the portion of the hidden layer in the non-refreshed dynamic memory, execute the portion of the hidden layer of the ANN model, based at least in part on the ANN custom weights for the portion of the hidden layer, to generate hidden layer output data, and store the hidden layer output data in the non-refreshed dynamic memory, and when the portion of the ANN model is at least a portion of the output layer:
generate the ANN custom weights for the portion of the output layer based on the ANN basis weights, store the ANN custom weights for the portion of the output layer in the non-refreshed dynamic memory, execute the portion of the output layer of the ANN model, based at least in part on the ANN custom weights for the portion of the output layer, to generate the output data, and store the output data in the static memory.

2. The hybrid memory hardware accelerator of claim 1, where the static memory is an embedded static random access memory (eSRAM) and the non-refreshed dynamic memory is a logic-compatible embedded dynamic random access memory (LC-eDRAM) that is not refreshed.

3. The hybrid memory hardware accelerator of claim 2, where the LC-eDRAM includes a bit-cell array and a bit-cell column that changes state faster than the bit-cell array, and the CE is configured to:
in response to detecting a change of state of the bit-cell column:
during execution of the portion of the input layer, regenerate and store the ANN custom weights for the portion of the input layer in the non-refreshed dynamic memory;
during execution of the portion of the hidden layer, regenerate and store the ANN custom weights for the portion of the hidden layer in the non-refreshed dynamic memory; and
during execution of the portion of the output layer, regenerate and store the ANN custom weights for the portion of the output layer in the non-refreshed dynamic memory.

4. The hybrid memory hardware accelerator of claim 1, where the CE is configured to:
in response to detecting an expiration of a countdown timer:
during execution of the portion of the input layer, regenerate and store the ANN custom weights for the portion of the input layer in the non-refreshed dynamic memory;
during execution of the portion of the hidden layer, regenerate and store the ANN custom weights for the portion of the hidden layer in the non-refreshed dynamic memory; and
during execution of the portion of the output layer, regenerate and store the ANN custom weights for the portion of the output layer in the non-refreshed dynamic memory.

5. The hybrid memory hardware accelerator of claim 1, where the CE is configured to:
store a portion of the ANN custom weights in the static memory based on ANN model training performance data; and store a portion of the input layer output data or the hidden layer output data in the static memory based on ANN model training performance data.

6. The hybrid memory hardware accelerator of claim 1, where:
the ANN model includes input layer parameters, hidden layer parameters, and output layer parameters;
the ANN custom weights for the portion of the input layer are generated based on the ANN basis weights and the input layer parameters;
the ANN custom weights for the portion of the hidden layer are generated based on the ANN basis weights and the hidden layer parameters; and
the ANN custom weights for the portion of the output layer are generated based on the ANN basis weights and the output layer parameters.

7. The hybrid memory hardware accelerator of claim 6, where the ANN custom weights for the portion of the input layer, the portion of the hidden layer and the portion of the output layer are generated by linear combinations of two or more ANN basis weights.

8. The hybrid memory hardware accelerator of claim 6, where the ANN custom weights for the portion of the input layer, the portion of the hidden layer and the portion of the output layer are generated by scaling ANN basis weights.

9. The hybrid memory hardware accelerator of claim 1, where the CE is connected to one or more additional CEs to form an array of CEs, and each CE executes a portion of the ANN model.

10. The hybrid memory hardware accelerator of claim 1, where:
the communication bus interface is configured to transmit the input layer output data;
the input data are associated with at least a portion of a hidden layer of the ANN model, the CE is configured to execute the portion of the hidden layer of the ANN model, based on the input data and the ANN custom weights for the portion of the hidden layer, to generate the hidden layer output data, and the communication bus interface is configured to transmit the hidden layer output data; or
the input data are associated with at least a portion of the output layer of the ANN model, the CE is configured to execute the portion of the output layer of the ANN model, based on the input data and the ANN custom weights for the portion of the output layer, to generate the output data.

11. The hybrid memory hardware accelerator of claim 1, where:
the CE is configured to execute a portion of the hidden layer of the ANN model, based on the input layer output data and the ANN custom weights for the portion of the hidden layer, to generate the hidden layer output data; or
the CE is configured to execute a portion of the output layer of the ANN model, based on the hidden layer output data and the ANN custom weights for the portion of the output layer, to generate the output data.

12. A method for accelerating an artificial neural network (ANN) using a hybrid memory hardware accelerator, comprising:
receiving, via a communications bus interface, at least a portion of an ANN model, ANN basis weights and input data, the ANN model including an input layer, one or more hidden layers and an output layer;
storing the portion of the ANN model, the ANN basis weights, and the input data in a static memory;

executing, by a computing engine (CE), the ANN model, including:
  when the portion of the ANN model is at least a portion of the input layer:
    generating ANN custom weights for the portion of the input layer based on the ANN basis weights, storing the ANN custom weights for the portion of the input layer in a non-refreshed dynamic memory, executing the portion of the input layer of the ANN model, based on the input data and the ANN custom weights for the portion of the input layer, to generate input layer output data, and storing the input layer output data in the non-refreshed dynamic memory;
  when the portion of the ANN model is at least a portion of a hidden layer of the ANN model:
    generating the ANN custom weights for the portion of the hidden layer based on the ANN basis weights, storing the ANN custom weights for the portion of the hidden layer in the non-refreshed dynamic memory, executing the portion of the hidden layer of the ANN model, based at least in part on the ANN custom weights for the portion of the hidden layer, to generate hidden layer output data, and storing the hidden layer output data in the non-refreshed dynamic memory;
  when the portion of the ANN model is at least a portion of the output layer:
    generating the ANN custom weights for the portion of the output layer based on the ANN basis weights, storing the ANN custom weights for the portion of the output layer in the non-refreshed dynamic memory, executing the portion of the output layer of the ANN model, based at least in part on the ANN custom weights for the portion of the output layer, to generate output data, and storing the output data in the static memory; and
  transmitting, via the communications bus interface, the output data.

13. The method of claim 12, where the static memory is an embedded static random access memory (eSRAM) and the non-refreshed dynamic memory is a logic-compatible embedded dynamic random access memory (LC-eDRAM) that is not refreshed.

14. The method of claim 13, where the LC-eDRAM includes a bit-cell array and a bit-cell column that changes state faster than the bit-cell array, and the method further comprises:
  in response to detecting a change of state of the bit-cell column:
    during execution of the portion of the input layer, regenerating and storing the ANN custom weights for the portion of the input layer in the non-refreshed dynamic memory;
    during execution of the portion of the hidden layer, regenerating and storing the ANN custom weights for the portion of the hidden layer in the non-refreshed dynamic memory; and
    during execution of the portion of the output layer, regenerating and storing the ANN custom weights for the portion of the output layer in the non-refreshed dynamic memory.

15. The method of claim 12, further comprising:
in response to detecting an expiration of a countdown timer:
  during execution of the portion of the input layer, regenerating and storing the ANN custom weights for the portion of the input layer in the non-refreshed dynamic memory;
  during execution of the portion of the hidden layer, regenerating and storing the ANN custom weights for the portion of the hidden layer in the non-refreshed dynamic memory; and
  during execution of the portion of the output layer, regenerating and storing the ANN custom weights for the portion of the output layer in the non-refreshed dynamic memory.

16. The method of claim 12, further comprising:
storing a portion of the ANN custom weights in the static memory based on ANN model training performance data; and
storing a portion of the input layer output data or the hidden layer output data in the static memory based on ANN model training performance data.

17. The method of claim 12, where:
the ANN model includes input layer parameters, hidden layer parameters, and output layer parameters;
the ANN custom weights for the portion of the input layer are generated based on the ANN basis weights and the input layer parameters;
the ANN custom weights for the portion of the hidden layer are generated based on the ANN basis weights and the hidden layer parameters; and
the ANN custom weights for the portion of the output layer are generated based on the ANN basis weights and the output layer parameters.

18. The method of claim 17, where the ANN custom weights for the portion of the input layer, the portion of the hidden layer and the portion of the output layer are generated by linear combinations of two or more ANN basis weights.

19. The method of claim 17, where the ANN custom weights for the portion of the input layer, the portion of the hidden layer and the portion of the output layer are generated by scaling ANN basis weights.

20. The method of claim 19, where the CE is connected to one or more additional CEs to form an array of CEs, and each CE executes a portion of the ANN model.

21. The method of claim 19, where the ANN custom weights for the portion of the input layer, the portion of the hidden layer and the portion of the output layer are generated by linear combinations of two or more ANN basis weights or by scaling ANN basis weights.

22. The method of claim 12, where:
transmitting, via the communications bus interface, the input layer output data;
the input data are associated with at least a portion of a hidden layer of the ANN model, the CE executes the portion of the hidden layer of the ANN model, based on the input data and the ANN custom weights for the portion of the hidden layer, to generate the hidden layer output data, and transmitting, via the communications bus interface, the hidden layer output data; or
the input data are associated with at least a portion of the output layer of the ANN model, and the CE executes the portion of the output layer of the ANN model, based on the input data and the ANN custom weights for the portion of the output layer, to generate the output data.

23. The method of claim 12, where:
the CE executes a portion of the hidden layer of the ANN model, based on the input layer output data and the ANN custom weights for the portion of the hidden layer, to generate the hidden layer output data; or the CE executes a portion of the output layer of the ANN model, based on the hidden layer output data and the ANN custom weights for the portion of the output layer, to generate the output data.

* * * * *